United States Patent [19]

Tuckey

[11] Patent Number: 4,458,654
[45] Date of Patent: Jul. 10, 1984

[54] FUEL VAPOR INJECTION SYSTEM
[75] Inventor: Charles H. Tuckey, Cass City, Mich.
[73] Assignee: Walbro Corporation, Cass City, Mich.
[21] Appl. No.: 357,689
[22] Filed: Mar. 12, 1982
[51] Int. Cl.³ ............................................. F02M 31/00
[52] U.S. Cl. ................................. 123/557; 123/549; 123/546; 261/144
[58] Field of Search ............... 123/470, 590, 557, 558, 123/546, 549, 545; 261/144, 145, 142; 48/180 H

[56] References Cited

U.S. PATENT DOCUMENTS

| | | | |
|---|---|---|---|
| 939,481 | 11/1909 | Dickson | 123/590 |
| 3,648,669 | 3/1972 | Rank | 123/558 |
| 3,762,378 | 10/1973 | Bitonti | 123/557 |
| 3,872,849 | 3/1975 | Chester | 123/546 |
| 3,933,135 | 1/1976 | Zillman | 123/557 |
| 4,034,729 | 7/1977 | Omachi | 123/557 |
| 4,103,658 | 8/1978 | Bernecker | 123/557 |
| 4,106,457 | 8/1978 | Totten | 123/590 |
| 4,112,899 | 9/1978 | Kramer | 123/557 |

FOREIGN PATENT DOCUMENTS

| | | | |
|---|---|---|---|
| 156239 | 12/1980 | Japan | 123/590 |
| 72252 | 6/1981 | Japan | 123/590 |

Primary Examiner—Ronald H. Lazarus
Attorney, Agent, or Firm—Barnes, Kisselle, Raisch, Choate, Whittemore & Hulbert

[57] ABSTRACT

A fuel supply system for internal combustion engines which utilizes an electronically controlled injection device for liquid fuel which is delivered to a heating chamber in the throttle body of a carburetor and vaporized so that gaseous fuel is delivered to the engine. Vaporization of the fuel is achieved by electric resistance elements and metered exhaust gases directed to the throttle body.

4 Claims, 4 Drawing Figures 4,458,654

FUEL VAPOR INJECTION SYSTEM

FIELD OF THE INVENTION

The use of vaporized fuel in an internal combustion engine and an apparatus for metering liquid fuel and vaporizing the fuel prior to introduction into an engine.

BACKGROUND OF THE INVENTION

For some time now various people have experimented with vaporizing gasoline and mixing it with air in proper proportions for internal combustion engines. There appears to be certain advantages in completely vaporizing fuel prior to its being mixed with air. Mainly these advantages are improved fuel mixture distribution to each cylinder of an engine and more uniform fuel-air mixture; thus, a leaner air-to-fuel ratio can be successfully achieved without engine misfire. Some of the problems encountered in attempting to vaporize gasoline have been in the area of metering the correct quantities of vapor to air.

The present invention contemplates metering liquid fuel prior to the vaporizing step. There are very efficient electronic fuel metering and fuel injection systems in production at this time. The most appropriate electronic fuel injection system to be used in conjunction with the present vapor system would be a low pressure single point electronic fuel injection system. The electronic "brain" of this system receives signals from various areas of the engine, its intake and exhaust systems, as well as ambient conditions. It is proposed to use this system in conjunction with a vaporizing unit located in the throttle body. The vaporizer will consist of a small chamber wherein exhaust heat is circulated through at a calibrated rate. Exhaust temperatures and pressures are related to throttle positions and engine power output. Based on this premise, a proper or consistent vaporizing temperature can be maintained at all throttle positions and engine operating conditions.

Thus, the invention includes the use of a system for metering liquid fuel and then vaporizing the metered fuel prior to its mixing with intake air. The proposed system will operate with any single point or throttle body fuel injection system. Any system which properly meters liquid fuel according to engine demand and discharges into a throttle body can be adapted to the present system.

The liquid fuel can be metered accurately and then vaporized to achieve accurate control of fuel quantities while obtaining the advantages of gaseous fuel with an appropriate air mixture.

Other objects of the invention will be apparent in the following description and claims in which the invention is described together with details directed to persons skilled in the art to enable practice of the invention all in connection with the best mode presently contemplated for the invention.

BRIEF DESCRIPTION OF THE DRAWINGS

Drawings accompany the disclosure and the various views thereof may be briefly described as.

DESCRIPTION OF THE INVENTION AND THE MANNER AND PROCESS OF USING IT

Figure 1:
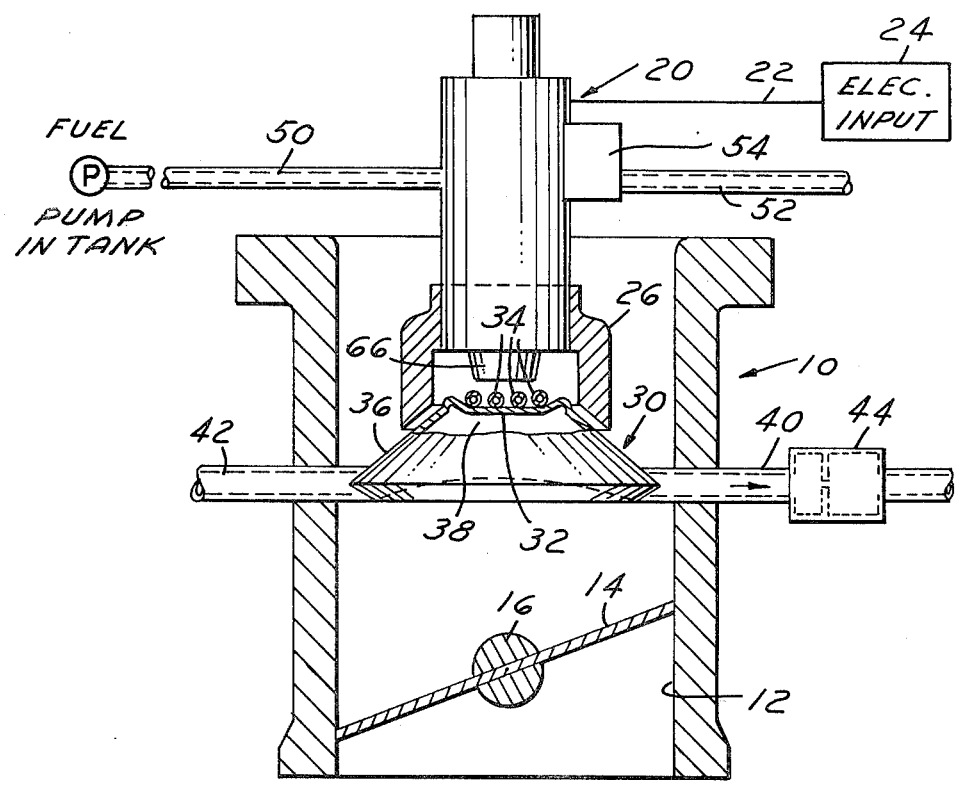
FIG. 1, a sectional view of a fuel vaporizer and air mixing passage on line 1—1 of FIG. 2.
Figure 2:
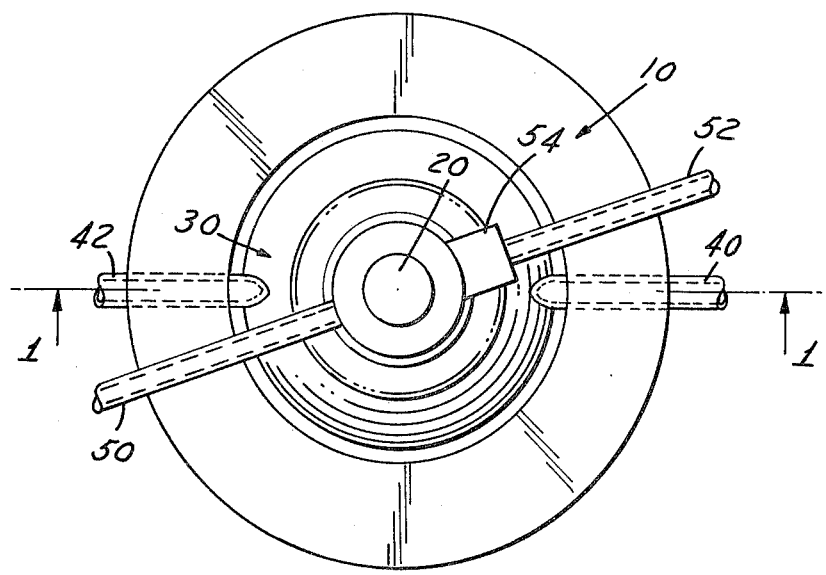
FIG. 2, a top view of the device.

With reference to the drawings, in FIGS. 1 and 2, a throttle body including a mixing passage housing 10 is shown having an air passage 12 leading to the fuel intake manifold of an engine. A throttle valve 14 of standard construction is operated by a throttle control shaft 16. The valve 14 is shown in idle position but would be in a vertical position at wide open throttle as viewed in FIG. 1.

Suspended within the housing 10 by suitable mechanical means is fuel injector device 20 electrically connected by line 22 to an electrical input device 24. This may be characterized as a constant pressure, single point, fuel injection system known in the industry. A micro-processor controls a solenoid valve in the injector. Thus, there is an electronically metered supply of liquid fuel. This is preferred to as a low pressure single point electronic fuel injection device. Below and surrounding the output of the input injector 20 is a heating unit including an annular shield 26. Below this shield 26 is an inverted conically shaped pan 30 which has a dished base 32 with electrical resistance heaters 34 mounted thereon. The pan 30 flares outwardly and downwardly at a skirt 36 in spaced relation to the shield 26. This skirt 36 terminates in spaced relation to the passage 12 and is closed at the bottom to provide a frusto-conical heating chamber 38 to serve as a heat exchanger. The annular space around the skirt 36 forms a venturi passage in said air passage where inflowing air and vaporized fuel will mix and pass on to the cylinders of an internal combustion engine.

Figure 4:
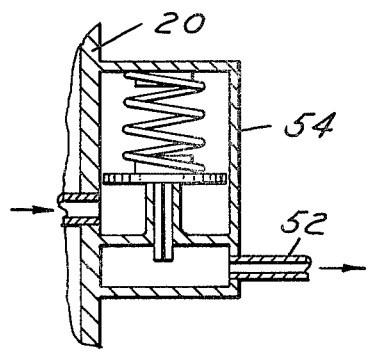
FIG. 4, a diagrammatic illustration of a pressure regulator.

An exhaust gas passage 40 opens into the chamber 38 which has an exhaust outlet passage 42. A calibrated orifice may be provided at 44 to limit the flow of hot exhaust gases and thus regulate the temperature of the heat chamber 38 which vaporizes the fuel. It will be appreciated that as the throttle opens, the greater quantity of liquid fuel requires more heat for vaporization but the exhaust pressure also increases and the available heat also increases in the chamber 38. Thus, there is an automatic compensation but the orifice 44 may be calibrated to achieve the desired results. A fuel inlet line 50 connects to the fuel injector device 20 from which a fuel vapor outlet line 52 leads to the tank as later described. A pressure regulator 54 may be interposed in the fuel vapor return line 52 as shown in FIG. 4. Optionally, a regulated poppet valve may be used here.

Figure 3:
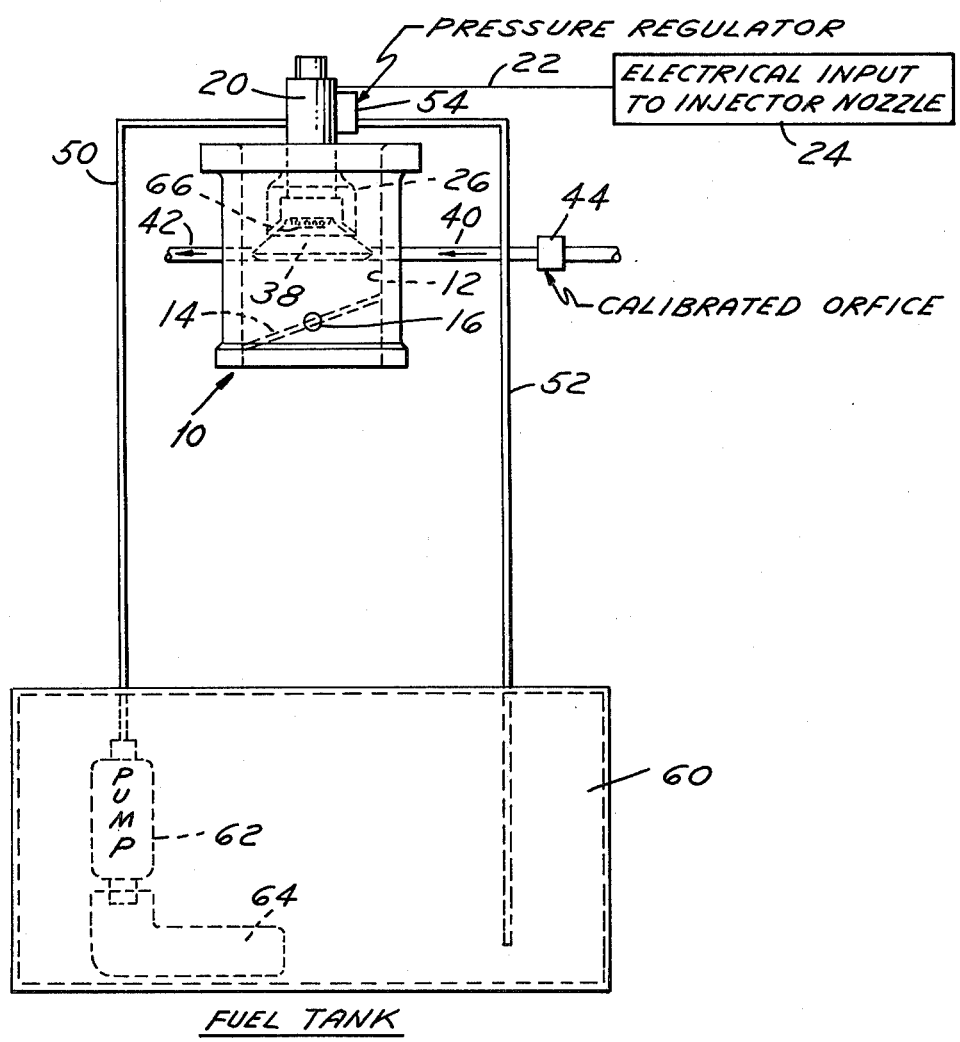
FIG. 3, a view of the circuit in connection with a fuel tank.

FIG. 3 illustrates the above-described assembly in relation to a fuel supply. The housing 10 and the related parts are mounted in relation to a fuel tank 60 in which is located a fuel pump 62 to apply a constant line pressure to the fuel supply line 50. A pump of this type eliminates the need for a pressure regulator. A pump inlet 64 is provided. The pump delivers liquid fuel through line 50 to the electronically controlled fuel injector 20 and fuel is dispensed in relation to demand to the outlet 66 where it impinges on the resistantce heaters 34 and passes over the flared heating chamber 38. Exhaust gas is passing through the chamber 30 via passages 40 and 42. Thus, liquid fuel discharged at 66 is totally vaporized by the action of the heaters 34 and the heated chamber 38. This vaporized fuel mixes with air entering the passage 12 at the top end as viewed in the drawings. The air and fuel vapor are mixed and forced through the restricted annular passage formed by the walls of passage 12 and the periphery of chamber 38.

The electric resistance heaters 34 can be used for the cold starting of an engine and then can be deactiviated when normal operating temperatures are reached in the exhaust gases.

The apparatus and system described with the single point injection and the vaporized fuel has the advantage that there can be an equal distribution of fuel to the respective cylinders. When a mixture of air and liquid fuel is passed into a manifold, there is a tendency for the heavy particles to drop out in the labyrinthal passages causing puddling and uneven distribution to the cylinders. With the vaporized fuel, this does not happen.

What is claimed as new is:

1. An apparatus for delivering a combustion fuel to cylinders of an internal combustion engine which comprises:
   (a) a throttle body having an air passage,
   (b) a heating unit in said body, and
   (c) a fuel injector device for delivering liquid fuel to said heating unit in said throttle body where it is converted to gaseous form and introduced into said passage,
   (d) a fuel guiding shield centrally of said air passage terminating in a circular housing having an outlet,
   (e) said heating unit comprising a frustro-conically shaped hollow chamber positioned with the smaller end inserted into said outlet to provide an annular fuel outlet along the sides of said chamber, said chamber forming with said air passage an annular venturi passage for mixture of in-flowing air and vaporized fuel said chamber including an inlet and an outlet connected to a conduit means carrying a source of heat.

2. The apparatus of claim 1 in which the outlet of the fuel guiding shield is inwardly chamfered and the heat source for said heating unit is hot engine exhaust gases.

3. The apparatus of claim 2 in which flow metering means are positioned in said conduit means in the form of a calibrated orifice to limit the flow of hot exhaust gases through said conduit means and said chamber.

4. The apparatus of claim 1 in which the smaller end has electrical resistance heaters mounted thereon.

* * * * *